United States Patent [19]

Ferrando

[11] Patent Number: 5,468,570
[45] Date of Patent: Nov. 21, 1995

[54] LIGHTWEIGHT ZINC ELECTRODE

[75] Inventor: William A. Ferrando, Arlington, Va.

[73] Assignee: The United States of America as represented by the Secretary of the Navy, Washington, D.C.

[21] Appl. No.: 379,380

[22] Filed: Jan. 26, 1995

[51] Int. Cl.⁶ .............................. H01M 4/38; H01M 4/48
[52] U.S. Cl. .......................... 429/217; 429/229; 429/231; 429/235; 429/245; 252/182.1
[58] Field of Search ........................... 429/217, 229–231, 429/235, 245, 190, 192; 252/182.1

[56] References Cited

U.S. PATENT DOCUMENTS

| | | | |
|---|---|---|---|
| 4,263,383 | 4/1981 | Coulombeau et al. | 429/217 |
| 4,358,390 | 11/1982 | Coulombeau et al. | 252/182.1 |
| 4,797,190 | 1/1989 | Peck | 429/190 X |
| 5,055,171 | 10/1991 | Peck | 204/290 |
| 5,197,993 | 3/1993 | Ferrando et al. | 29/2 |
| 5,211,827 | 5/1993 | Peck | 204/252 |
| 5,283,138 | 2/1994 | Ferrando | 429/217 |
| 5,362,580 | 11/1994 | Ferrando et al. | 429/247 |

Primary Examiner—Anthony Skapars
Attorney, Agent, or Firm—Roger D. Johnson

[57] ABSTRACT

A light weight zinc electrode made of
(1) a mat of nickel metal coated graphite fibers; and
(2) a composite material of zinc active material and a hydrogel dispersed in a solid, impervious, inert polymer matrix,
wherein the composite material surrounds the individual nickel metal coated graphite fibers of the sintered mat which support the composite material and provide paths of electrical conductivity throughout the composite material.

15 Claims, 5 Drawing Sheets

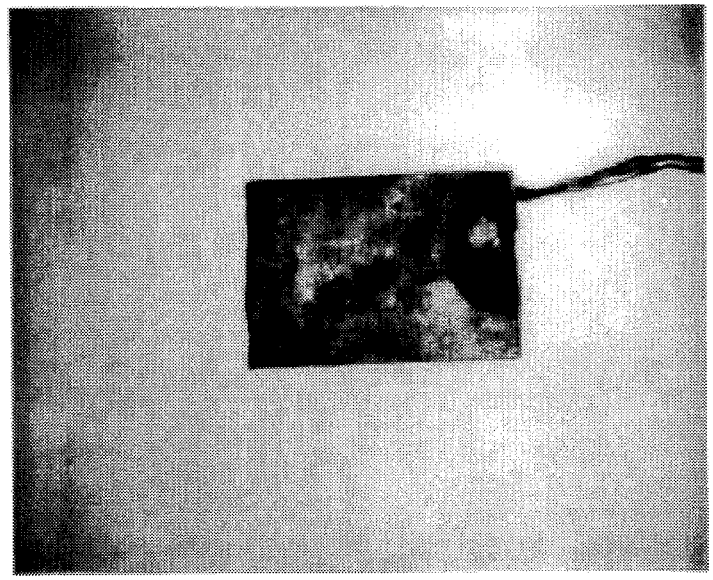
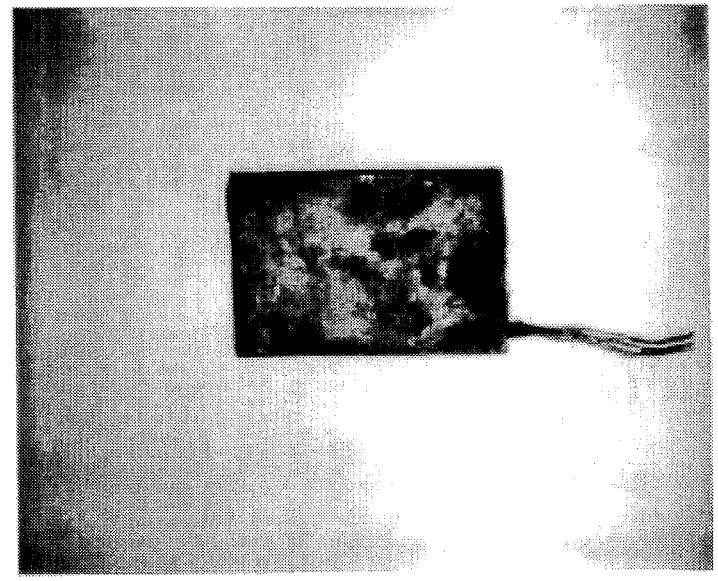
FIG. 2

LIGHTWEIGHT ZINC ELECTRODE

BACKGROUND OF THE INVENTION

This invention relates to electrochemical cells and more particularly to zinc electrodes for electrochemical cells.

Development of a stabilized zinc secondary electrode is desirable for several good reasons. Zinc is a quite abundant and reasonably inexpensive metal. Its electrode discharge potential is relatively high and equivalent weight low. The zinc electrode in common construction shows good electrical conductivity and is capable, therefore, of showing good high rate discharge capability. Finally, zinc has been found to be more environmentally benign than most other metals.

Unfortunately, the slight solubility of zinc in the electrolyte produces an irreversibility on cycling. Some zinc goes into solution during charge, which is replated upon discharge. The nonuniformity of this process, however, gives rise to dendritic penetration of the separator and densification of the active material. The former causes shorting of the cell, while the latter results in gradual loss of capacity.

Much research has been devoted to stemming this zinc migration in secondaries. Some have used electrolyte additives to decrease zinc solubility. Others have added alloying compounds to the electrode itself. Although undeniable progresses has been achieved, these approaches have yet to be completely satisfactory.

Robert L. Peck in U.S. Pat. No. 4,797,190, titled., "Ionic Semiconductor Materials and Applications Thereof," discloses an ionic transport membrane composite which includes from 10 to 50 weight percent of a hydrogel dispersed within a nonporous matrix material. Peck also teaches that by adding zinc or zinc oxide, a well as graphite powder or metal powder or fibers for conductance, to the composite and attaching the composite to a copper plated stainless steel grid, a zinc electrode can be produced. The electrode is resistant to zinc dendrite formation. However, carbon or graphite powder provides relatively poor conduction. Metal powder or fibers, while good conductors, add substantial weight to the electrode. Similarly, standard metal grids or current collectors, such as copper plated stainless screens, add substantial weight to the electrode.

It would be desirable to produce a zinc electrode which possesses the features of the Peck electrode but which is lightweight.

SUMMARY OF THE INVENTION

Accordingly, an object of this invention is to provide a new zinc electrode.

Another object of this invention is to provide a lightweight zinc electrode.

A further object of this invention is to provide a lightweight zinc electrode that is resistant to zinc dendrite formation.

These and other objects of this invention are accomplished by providing:
a zinc electrode comprising
  A. a mat of nickel metal coated graphite fibers; and
  B. a zinc active material/hydrogel/inert polymer matrix composite material comprising
    (1) from about 55 to about 80 weight percent of a zinc active material that is zinc, zinc oxide, zinc hydroxide, or mixtures thereof wherein the weight percentage is based on the equivalent amount of zinc oxide, and with
    (2) the remainder of the zinc active material/hydrogel/ inert polymer matrix material composite being a hydrogel/inert polymer matrix composite material comprising
      (a) from about 4 to about 20 weight percent of the hydrogel, and with
      (b) the remainder of the hydrogel/inert polymer matrix composite material being an impervious, solid, inert polymer matrix,
    wherein the zinc active material and the hydrogel are each dispersed within the inert polymer matrix;
  and wherein the zinc active material/hydrogel/inert polymer matrix material composite surrounds the individual nickel metal coated graphite fibers of the mat and the nickel metal coated graphite fibers provide paths of electrical conductivity throughout the zinc active material/hydrogel/inert polymer matrix composite material.

BRIEF DESCRIPTION OF THE DRAWINGS

A more complete appreciation of the invention and many of its attendant advantages thereof will be readily appreciated as the same becomes better understood by reference to the following detailed description when considered in connection with the accompanying drawings wherein:

FIG. 2 is a photograph of a zinc electrode which is an embodiment of this invention after it has been through 360 charge/discharge cycles as described in example 1;

DETAILED DESCRIPTION OF THE PREFERRED EMBODIMENT

The present invention provides a light weight zinc electrode which is made of a mat of nickel metal coated (or plated) graphite fibers which functions as a support grid and current collector for a zinc active material/hydrogel/inert polymer matrix composite material. The zinc active material/hydrogel/inert polymer matrix composite material is melt pressed or injection molded into the sintered nickel coated graphite fiber mat so that the composite material is attached to and surrounds the fibers.

Figure 1:
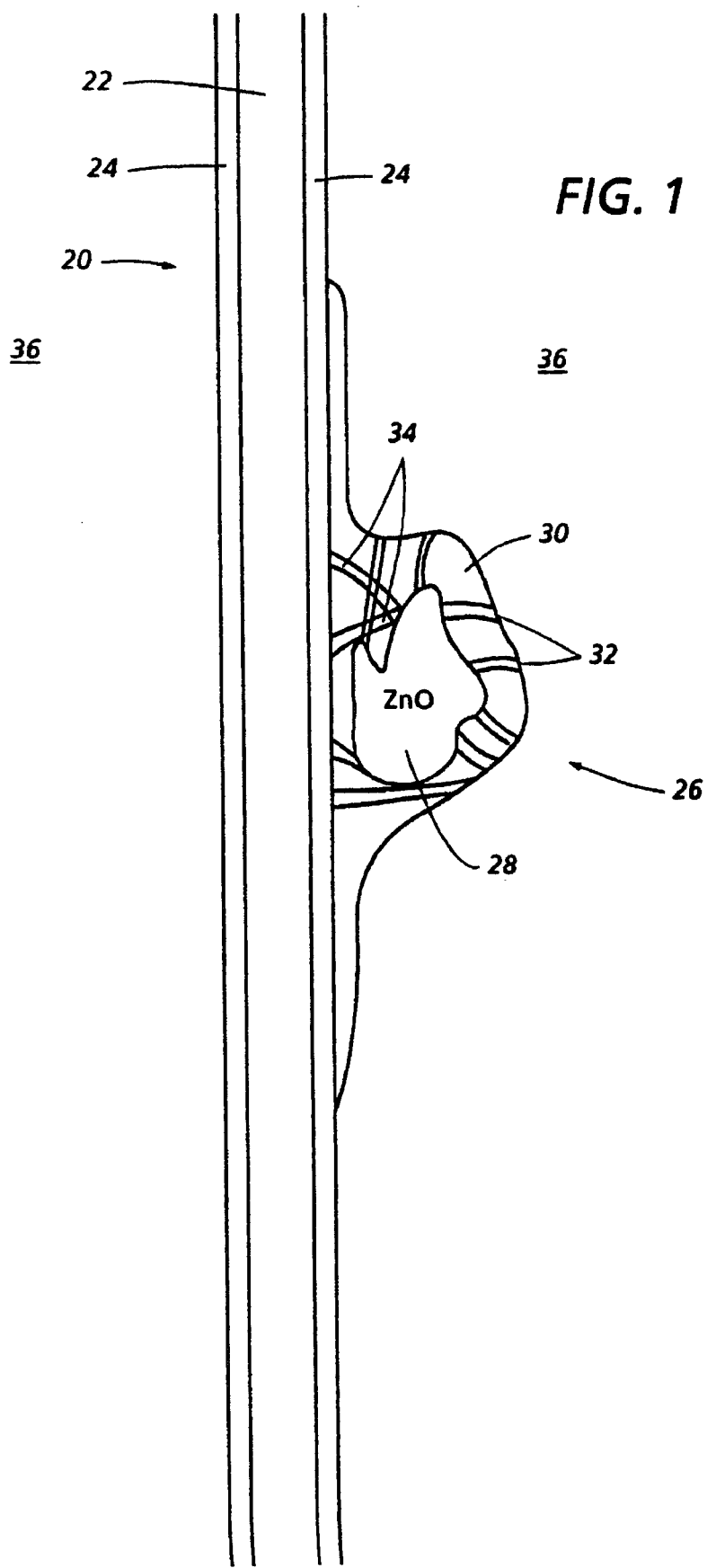
FIG. 1 is a schematic drawing illustrating the relationship between the components of the zinc electrode of this invention.

FIG. 1 is a schematic which represents a portion of one fiber in the mat as used in the battery. Shown is the nickel metal coated fiber 20 which is made of the graphite fiber 22 and the nickel metal coating 24. Attached to the fiber 20 is a portion of zinc active material/hydrogel/inert polymer matrix composite material 26 which comprises a zinc active material 28 (e.g. ZnO) substantially uniformly dispersed in a matrix of an inert, impervious, nonporous polymer 30. Hydrogel channels 32 and 34 are formed by substantially uniformly dispersing the hydrogel within the inert polymer matrix 30. Shown are hydrogel channels 32 which lead from the zincate saturated 38% KOH electrolyte 36 to the zinc active material 28. Other hydrogel channels 34 provide electron paths from the zinc active material 28 to the nickel coating 24 of the nickel-coated graphite fiber 20 of the current collector/support grid.

Applicant hereby incorporates by reference in its entirety U.S. Pat. No. 4,797,190, which is titled, "Ionic Semiconductor Materials and Applications Thereof," which issued on Jan. 10, 1989 to Robert L. Peck. Specifically Peck teaches a semiconductor membrane composite comprising an inert, solid impervious, nonporous polymer matrix with hydrogel dispersed within the polymer matrix. Peck (column 3, line 67 through column 4, line 2) discloses polyvinylidene chloride, polyvinyl chloride, polyvinylidene fluoride, polyethylene, polypropylene, urethane, and phenol formaldehyde as the preferred matrix polymers. Peck (column 3, lines 59–66) teaches that synthetic long chain polymeric hydrogels such as polyethylene oxide, polyacrylic acid, and polyacrylamide are preferred. Peck also discloses that hydrogels from natural sources such as hydroxyethyl cellulose, gelatin, pectin, cellulose, and starch may also be used but are less preferred. Peck (column 1, lines 1–10) also discloses coupling agents that may be added to bond the hydrogel to the matrix polymer and thus reduce the leaching of the hydrogel from the matrix. Preferred coupling agents include polyacrylic acid, phenolic resin, cellulosic titanate, carbon, lignin, and silica.

Peck (U.S. Pat. No. 4,797,190 which is incorporated by reference in its entirety) also discloses methods of making the hydrogel/polymer matrix semiconductor membranes at column 9, line 62 through column 16, line 2, which includes examples 1 through 19. The present specification provides further teachings in examples 1 and 2.

Example 23 of Peck discloses a zinc electrode that is prepared by adding zinc oxide to a hydrogel/inert polymer matrix composite. Peck also teaches that it is necessary to add carbon or metal particles or fibers to the membrane to make it electrically conducting. Peck then attaches the zinc oxide/hydrogel/matrix polymer electrode membrane to a copper plated stainless steel screen.

In the electrode of the present invention the stainless steel screen of Peck is replaced with a mat of nickel metal coated graphite fiber. This nickel coated graphite fiber mat is considerably lighter than the solid metal grid of Peck. Moreover, the mat is composed of a multitude of nickel coated thin (e.g., ~10 micron) graphite fibers. The zinc active material/hydrogel/inert polymer matrix composite material is hot pressed into the mat so that the composite surrounds the fibers of the mat. As a result there is a network of fine nickel coated graphite fibers running throughout the zinc active material/hydrogel/inert polymer matrix composite material which provides electric conductivity through the composite material. This eliminates the need for the 8 percent added weight of loose carbon particles and fibers which Peck must add in his example 23 to provide electrical conductivity. Moreover, the nickel metal coated graphite fibers provide much better electrical conductivity than simple graphite carbon fibers and powder do. Peck teaches that metal powder or fibers may be used in place of carbon as a conductive material. Copper, for example, is an excellent conductor. However, Copper has a specific density of 8.96 g/cc and thus provides much less surface per gram. A cell using enough copper powder or fibers to provide good electrical conductivity throughout the zinc active material/hydrogel/inert polymer matrix composite material would be very heavy.

The electrode grid for the present invention is produced by coating high density graphite fibers in the form of a mat or web with nickel metal. Examples of suitable nickel coated carbon fiber mat grids and methods of making them are disclosed in U.S. Pat. Nos. 5,917,993 (sinter process) and 5,362,580 (sinterless process) both of which are hereby incorporated by reference in their entirety. A more preferred nickel metal coated carbon fiber mat has been produced by the International Nickel Company (Inco) and given the designation nickel plated (or coated) C500 graphite fiber paper. Inco produces this mat by decomposing $Ni(CO)_4$ vapor on the heated surfaces of a commercially available porous carbon paper which is a mat of pressed carbon fibers. The resulting nickel metal plated or coated graphite fiber mat has large pores (about 70 Å) into which the zinc active material/hydrogel/inert polymer matrix composite material can be easily and effectively melt pressed. The preferred embodiment electrode uses the Inco nickel metal plated C500 graphite fiber mat as the grid.

The electrode is produced by hot pressing the zinc active material/hydrogel/inert polymer matrix composite material into the nickel metal coated graphite fiber mat. As a result of this hot pressing procedure the zinc active material/hydrogel/inert polymer matrix composite material surrounds the individual nickel-coated graphite fibers of the sintered mat. The nickel-coated graphite fibers provide electrical conduction paths throughout the composite material and also provide physical support for the composite material. The nickel-coated graphite fibers of the mat are interconnected to form an electrical grid from which electrical current can be drawn.

Examples 1 and 2 illustrate this procedure by hot pressing (195° C.) a zinc active material/hydrogel/inert polymer matrix composite material of zinc oxide (active material) and polyacrylic acid (hydrogel) dispersed within a solid, nonporous polypropylene matrix into a Inco nickel metal coated C500 carbon fiber mat using steel plates. The hot composite material will stick to the steel plates causing the electrodes to be torn when the steel plates are removed. The use of DAG release compounds or even Teflon coatings on the steel plates have not corrected this problem. However, the problem has been eliminated by placing a thin metal foil (for example aluminum foil) between the hot composite material and the steel plates. The steel plates easily and clearly release from the metal foil. After the electrode has been cooled, the metal foil is then peeled from the electrode surface. This procedure was demonstrated by example 1 and 2.

The zinc active material when added may be in the form of zinc, zinc oxide, zinc hydroxide, or mixtures thereof, with zinc oxide being the preferred form. The weight percentage ranges are based on all of the zinc active material being in the form of zinc oxide. When zinc or zinc hydroxide are added the weight amount used should be adjusted accordingly. The zinc active material (ZnO or equivalent) preferably comprises from about 55 to about 80, more preferably from 65 to 80, still more preferably 70 to 80, and even more preferably from 74 to 76 weight percent of the zinc active material/hydrogel/inert polymer matrix composite material with the hydrogel and, the inert matrix polymer comprising the remainder. These percentages are based on the zinc active material, the hydrogel, and the inert matrix material being dry. If less than about 55 weight percent of zinc active (ZnO) material is used the electrode becomes inactive. As the weight percentage of the zinc active material is increase the electrical activity and storage capacity of the electrode increases. As the zinc active material increases above about 80 weight percent, the binder becomes less able to hold the zinc material from solution and the cycle life of the electrode decreases. The zinc active material (ZnO) comprises about 75 weight percent of the zinc active material/hydrogel/inert polymer matrix composite material in the preferred embodiment.

The hydrogel preferably comprises from 4 to 20, more preferably from 6 to 16, still more preferably from 6 to 12, and most preferably 7 to 9 weight percent of the dry hydrogel/inert polymer matrix composite material. In the preferred embodiment the hydrogel comprises about 8 weight percent of the hydrogel/inert polymer matrix composite material. These weight percentages are based on the hydrogel and the inert polymer matrix being dry. If too little hydrogel is used, the cell will not function properly. On the other hand, if too much hydrogel is used, zinc active material will be leached into solution and redeposited as dendrites which shorten the cycle life of the battery.

The preferred inert matrix polymers are solid, nonporous forms of polyvinylidene chloride, polyvinyl chloride, polyvinylidene fluoride, polyethylene, polypropylene, urethane, phenol, formaldehyde, or mixtures thereof; with polyvinylidene chloride, polyvinyl chloride, polyvinylidene fluoride, polyethylene, polypropylene, or mixtures thereof being more preferred, and with polyethylene, polypropylene, or mixtures thereof being still more preferred. Compatible copolymers such as polyethylene/polypropylene copolymers may also be used. Because the preferred use of the zinc electrode is in high discharge rate cells, the matrix polymer material should be tested for resistance to attack by 38% KOH.

As Peck teaches the preferred hydrogels include polyethylene oxide, polyacrylic acid, polyacrylamide, hydroxyethyl cellulose, gelatin, pectin, cellulose, starch, or mixtures thereof, with polyethylene oxide, polyacrylic acid, polyacrylamide, or mixtures thereof being more preferred because of their greater resistance to leaching. Of these polyacrylic acid is the most preferred and may be mixed with polyethylene oxide or polyacrylamide to increase their resistance to leaching. However, as the Peck patent teaches the combination of a given hydrogel and a given matrix polymer should be tested for good chemical bonding and thus resistance to leaching.

The general nature of the invention having been set forth, the following examples are presented as specific illustrations thereof. It will be understood that the invention is not limited to these specific examples, but is susceptible to various modifications that will be recognized by one of ordinary skill in the art.

In the following examples 1 and 2, polyacrylic acid (Carbopol 940, Goodrich) was used as the hydrogel, polypropylene (Profax pco 72, Himont, USA) was used as the inert polymer, and ZnO (Johnson Matthey) was added as the zinc active material.

Example 1

A composite zinc electrode was prepared using a composition of 2 weight percent polyacrylic acid (Carbopol 940, Goodrich), 23 weight percent polypropylene (Profax pco 72, Himont, USA) and 75 weight percent ZnO (Johnson Matthey) comprising the active material mixture. The composite fiber substrate consisted of two sheets (approx 2"×3") of nickel plated C500 graphite fiber paper (International Nickel Company) sandwiched around an expanded silver metal screen. A silver plated copper wire tab had been welded to the corner of the screen.

The active material was prepared as follows:

1. The Polyacrylic acid was thoroughly mixed into several hundred milliliters of water using a small paddle blender. The mixture was neutralized with ammonium hydroxide to obtain maximum unfolding of the polymer.
2. The polypropylene was thoroughly mixed into the above mixture.
3. The resulting polyacrylic acid/polypropylene/water mixture was dried at about 60° C.
4. The dried mixture was thoroughly melt blended in a hand press at approximately 195° C.
5. The ZnO powder was added to the polyacrylic acid/polypropylene melt mixture while still in the open press and thoroughly melted blended in to produce a polyacrylic acid/polypropylene/ZnO mixture.
6. The blended polyacrylic acid/polypropylene/ZnO mixture was removed from the press, cooled and ground in a coffee type grinder to relatively small particles.
7. A layer of the polyacrylic acid/polypropylene/ZnO mixture was spread on a foil covered mold backplate, topped by a sheet of nickel plated C500 graphite fiber paper. Another layer of the mixture was spread on the C500, followed by the screen. The second layer of C500 topped by the remainder of the mixture was covered with a second foil and surmounted by a top plate.
8. The mold was placed in the press and allowed to heat to 195° C. (about 10 minutes) before pressing to a thickness of about 40 mils.
9. The pressure on the mold was maintained until it cooled to below 100° C. The mold was removed from the press, top and bottom plates removed and foils peeled off releasing the pressed composite electrode.

The above electrode was trimmed and fabricated into a cell containing an excess of commercial sintered positive nickel electrodes, with several wraps of cellophane and a wrap of woven nylon cloth. The cell was cycled in a 40 weight percent KOH, zincate saturated electrolyte. Regime of C/3 charge to about 75 percent of theoretical capacity, followed by C/3 discharge to 100 percent DOD was used. More specifically, C/3 charge of 3.4 ampere hours in, followed by C/3 discharge to 1.0 volt cutoff was used. The theoretical electrode capacity was about 4.5 ampere hour.

Figure 3:
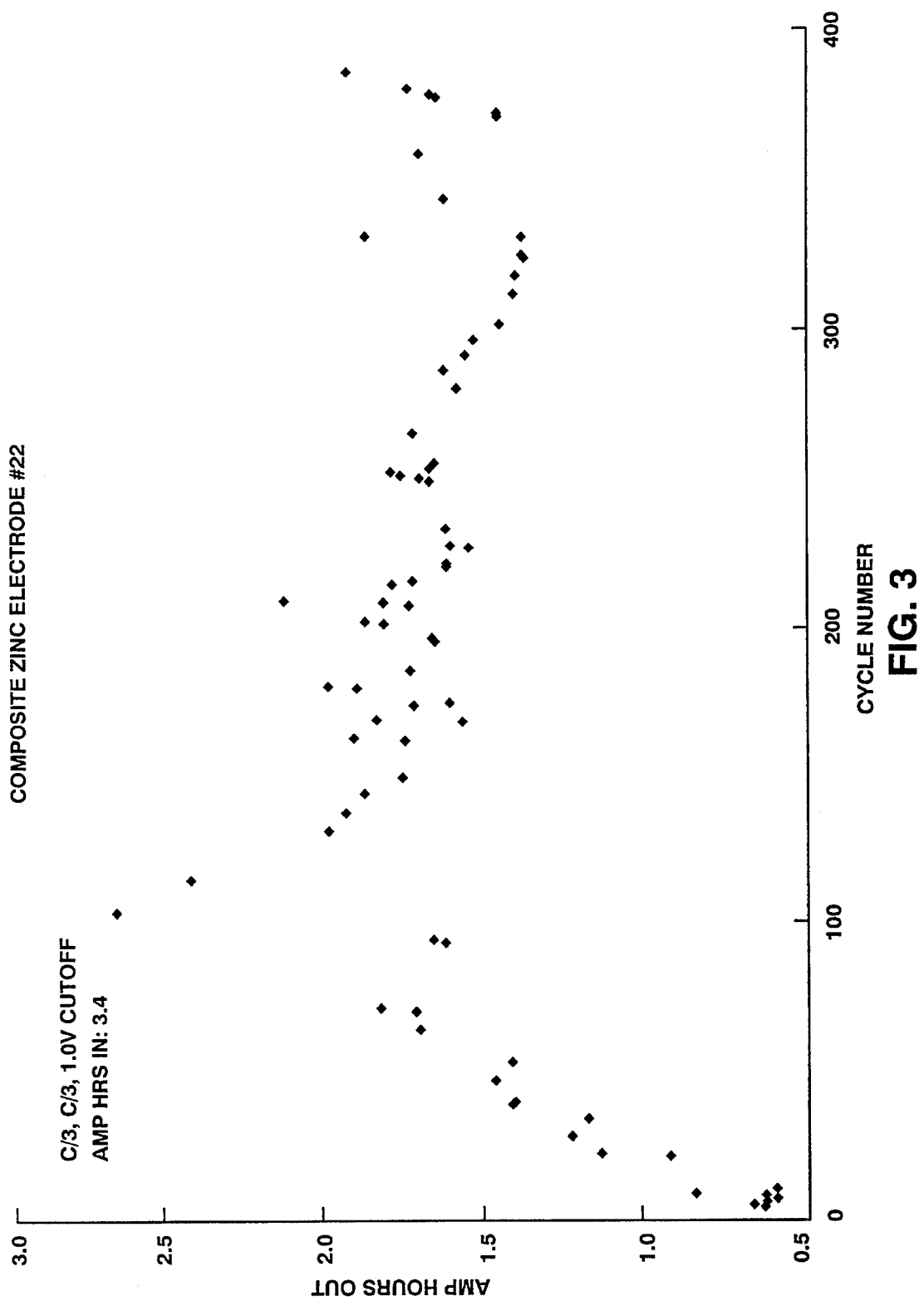
FIGS. 3 and 4 are graphs plotting cell capacity versus charge/discharge cycle number for zinc electrodes which are embodiments of the present invention and are discussed in examples 1 and 2, respectively.

FIG. 3 shows the capacity vs cycle number for this test. The electrode was remove at 360 cycles and photographed (FIG. 2) to show the absence of zinc species migration at this point. A good degree of uneven swelling was observed, however.

Example 2

Figure 4:
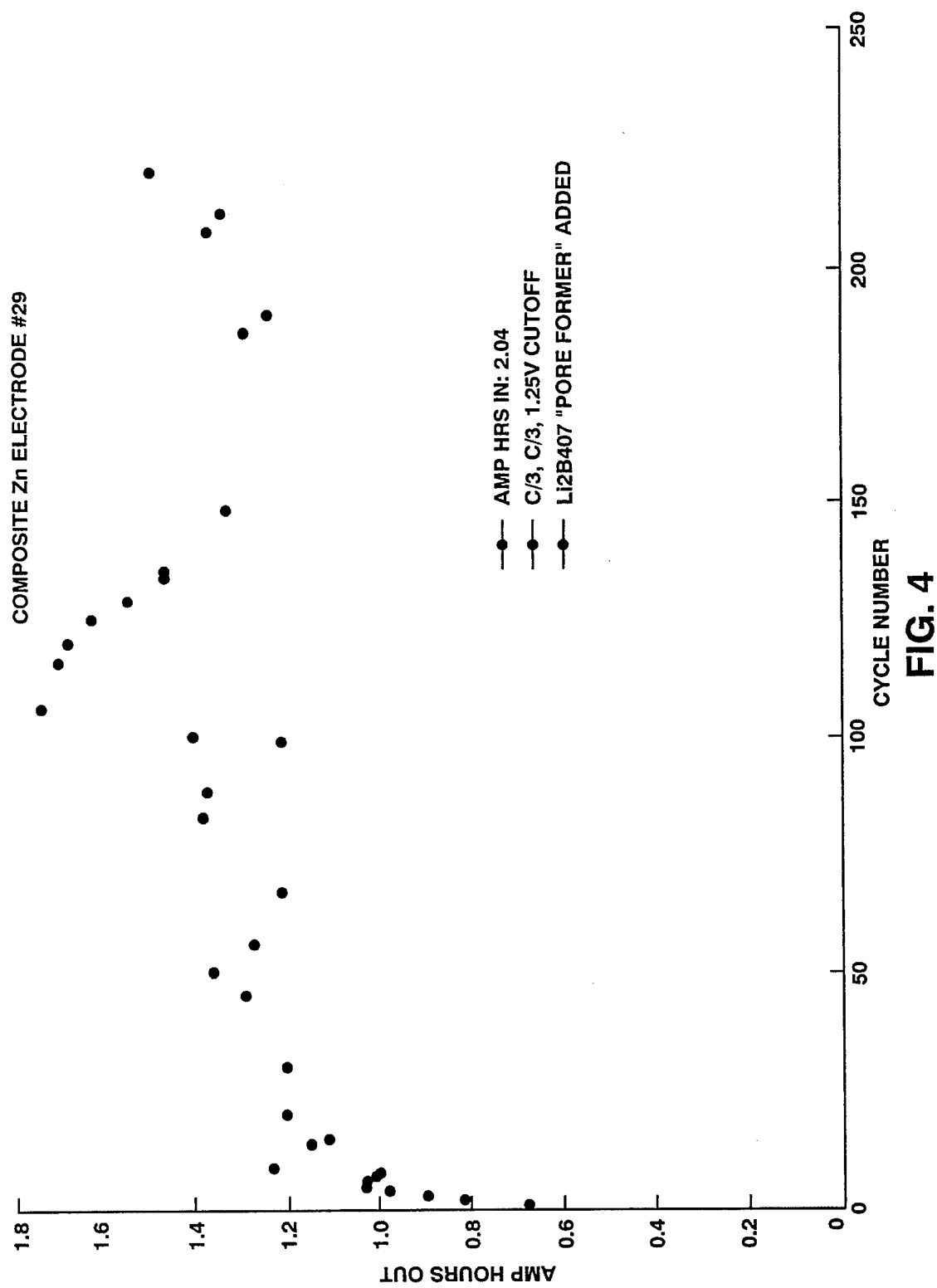

A second composite electrode was fabricated following as closely as possible the formulation and procedures of example 1. Prior to filling the mold, however, lithium tetraborate ($Li_2B_4O_7$) powder was added to the ground polyacrylic acid/polypropylene/ZnO mixture in the weight proportion of 1:6. The purpose of this was to act as in situ "pore-former" by dissolving out in to the electrolyte during initial cycling. This should allow better access of the electrolyte to the electrode interior. This, in turn, should decrease the polarization and provide a flatter discharge curve. This, in fact, was observed. FIG. 4 shows the cycle data to about 250 cycles for this electrode. The regime used was C/3 charge of 2.04 ampere hours in followed by C/3 discharge to 1.25 volt cutoff.

Note that the weight of lithium tetraborate powder added to the electrode is taken into account in the formulation of the electrolyte.

Example 3

Figure 5:
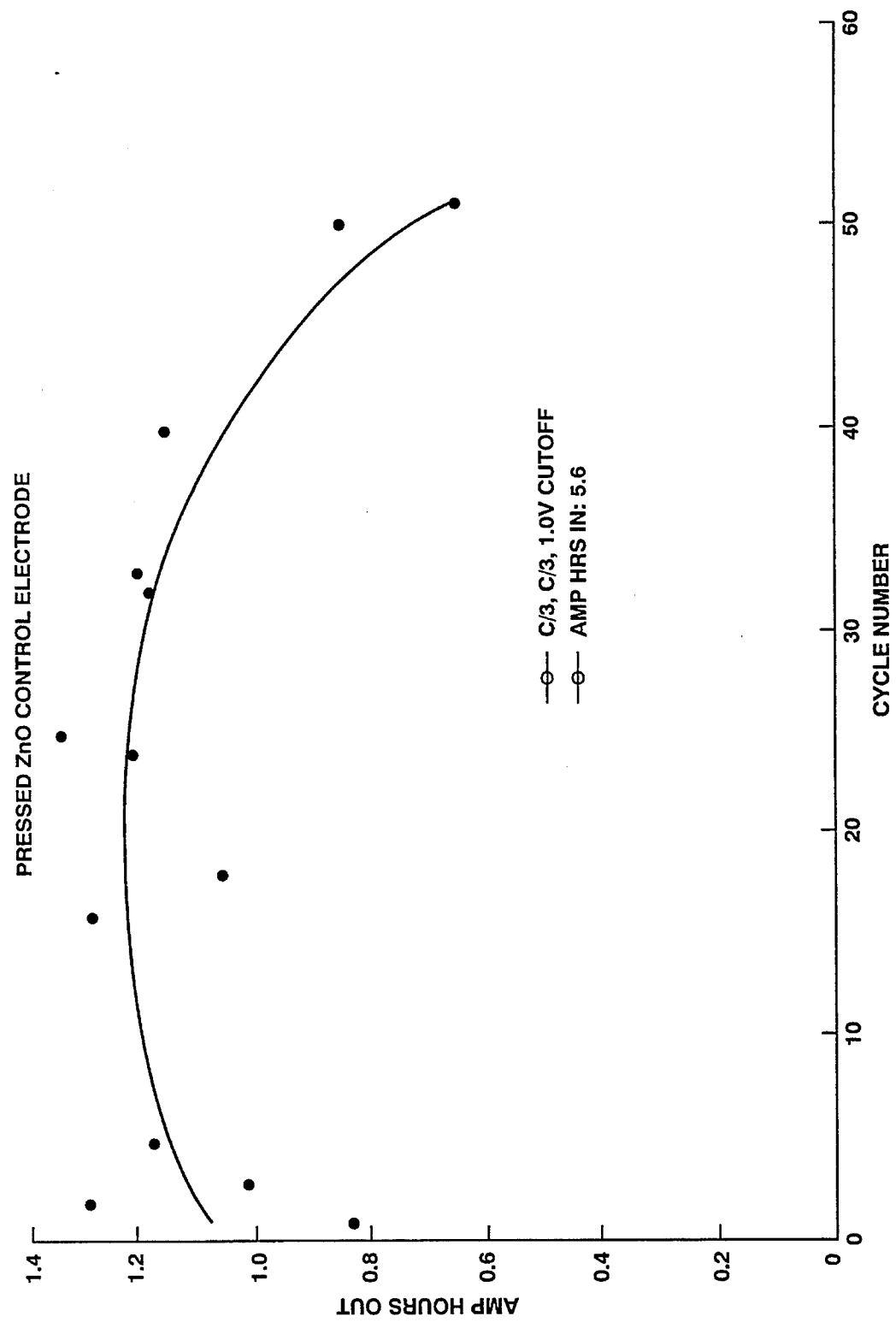
FIG. 5 is a graph plotting cell capacity versus charge/ discharge cycle number for a conventional electrode of ZnO oxide which is used for comparison and which is discussed in example 3.

For comparison, a control electrode of ZnO powder pressed onto a conventional perforated copper foil negative electrode grid was tested by a regime of C/3 charge of 5.6 ampere hours in followed by C/3 discharge to 1.0 volts cutoff. The active material mix consisted of 15 g ZnO powder, 0.75 g Teflon powder binder and 0.5 g mercuric oxide. The calculated theoretical capacity was about 7.5 ampere hours. The results shown in FIG. 5 demonstrate that there is a rapid loss in charge capacity.

Obviously, other modifications and variations of the present invention may be possible in light of the foregoing teachings. It is therefore to be understood that within the scope of the appended claims the invention may be practiced otherwise than as specifically described.

What is claimed is:

1. A zinc electrode comprising
   A. a sintered mat of nickel metal coated graphite fibers; and
   B. a zinc active material/hydrogel/inert polymer matrix composite material comprising
      (1) from about 55 to about 80 weight percent of a zinc active material that is zinc, zinc oxide, zinc hydroxide, or mixtures thereof wherein the weight percentage is based on the equivalent amount of zinc oxide, and with
      (2) the remainder of the zinc active material/hydrogel/inert polymer matrix composite material being a hydrogel/inert polymer matrix composite material comprising
         (a) from about 4 to about 20 weight percent of the hydrogel, and with
         (b) the remainder of the hydrogel/inert polymer matrix composite material being an impervious, inert matrix polymer,
      wherein the zinc active material and the hydrogel are each dispersed within the inert polymer matrix;
   wherein the zinc active material/hydrogel/inert polymer matrix composite material surrounds the individual nickel metal coated graphite fibers of the sintered mat and the nickel metal coated graphite fibers provide paths of electrical conductivity throughout the zinc active material/hydrogel/inert polymer matrix composite material.

2. The zinc electrode of claim 1 wherein the hydrogel comprises from 4 to 16 weight percent of the hydrogel/inert polymer matrix composite.

3. The zinc electrode of claim 2 wherein the hydrogel comprises from 6 to 12 weight percent of the hydrogel/inert polymer matrix composite.

4. The zinc electrode of claim 3 wherein the hydrogel comprises from 7 to 9 weight percent of the hydrogel/inert polymer matrix composite.

5. The zinc electrode of claim 1 wherein the zinc active material comprises from 65 to 80 weight percent of the zinc active material/hydrogel/inert polymer matrix composite material.

6. The zinc electrode of claim 5 wherein the zinc active material comprises from 70 to 80 weight percent of the zinc active material/hydrogel/inert polymer matrix composite material.

7. The zinc electrode of claim 6 wherein the zinc active material comprises from 74 to 76 weight percent of the zinc active/hydrogel/inert polymer matrix composite material.

8. The zinc electrode of claim 1 wherein the hydrogel is polyethylene oxide, polyacrylic acid, polyacrylamide, hydroxethyl cellulose, gelatin, pectin, cellulose, starch, or mixtures thereof.

9. The zinc electrode of claim 8 wherein the hydrogel is polyethylene oxide, polyacrylic acid, or polyacrylamide, or mixtures thereof.

10. The zinc electrode of claim 9 wherein the hydrogel is polyacrylic acid.

11. The zinc electrode of claim 1 wherein the inert matrix polymer is polyvinylidene chloride, polyvinyl chloride, polyvinylidene fluoride, polyethylene, polypropylene, urethanes, phenol formaldehyde or mixtures thereof.

12. The zinc electrode of claim 11 wherein the inert matrix polymer is polyvinylidene chloride, polyvinyl chloride, polyvinylidene fluoride, polyethylene, polypropylene, or mixtures thereof.

13. The zinc electrode of claim 12 wherein the inert matrix polymer is polyethylene, polypropylene, or mixtures thereof.

14. The zinc electrode of claim 13 wherein the inert matrix polymer is polypropylene.

15. The zinc electrode of claim 13 wherein the inert matrix polymer is polyethylene.

\* \* \* \* \*